United States Patent [19]

Rodgers

[11] Patent Number: 4,614,755

[45] Date of Patent: Sep. 30, 1986

[54] PROTECTIVE COATING COMPOSITION COMPRISING A BLEND OF POLYVINYL ACETATE, HYDRAULIC CEMENT, EVA, AND LIMESTONE

[76] Inventor: Jack L. Rodgers, R.D. #2 - Box 573, Seneca, Pa. 16346

[21] Appl. No.: 745,786

[22] Filed: Jun. 17, 1985

Related U.S. Application Data

[63] Continuation-in-part of Ser. No. 697,958, Feb. 4, 1985, abandoned.

[51] Int. Cl.⁴ .......................... C08K 3/10; C08J 3/20; C08L 31/04
[52] U.S. Cl. .......................................... 524/5; 524/4; 524/524
[58] Field of Search ................................ 524/4, 5, 524

[56] References Cited

U.S. PATENT DOCUMENTS

| | | | |
|---|---|---|---|
| 3,058,520 | 10/1962 | Woodward et al. | 524/5 |
| 3,303,147 | 2/1967 | Elden | 524/5 |
| 4,077,809 | 3/1978 | Plunguian et al. | 524/5 |
| 4,088,804 | 5/1978 | Cornwell et al. | 524/5 |
| 4,267,092 | 5/1981 | Glaser et al. | 524/5 |
| 4,325,858 | 4/1982 | Saito et al. | 524/524 |
| 4,434,257 | 2/1984 | Narisawa et al. | 524/5 |
| 4,504,318 | 3/1985 | Matsuda et al. | 524/5 |

FOREIGN PATENT DOCUMENTS

| | | | |
|---|---|---|---|
| 1584524 | 12/1969 | France | 524/5 |
| 0316672 | 10/1971 | U.S.S.R. | 524/5 |

OTHER PUBLICATIONS

Air Product Literature, "Airflex 400 Base for Adhesives", 1980.
Air Product Literature, "Vinac RP-251", 1975.

*Primary Examiner*—Herbert J. Lilling
*Attorney, Agent, or Firm*—James Irwin

[57] ABSTRACT

There is disclosed a protective, waterproof coating composition suitable for application to surfaces of concrete, wood or metal to provide each surface with increased abrasion and chemical resistance. The composition comprises a blend of hydraulic cement in the range of 5 to 18 wt. %, 200 mesh limestone in the range of 20 to 50 wt. %, 0.5 to 6.0 wt. % polyvinyl acetate, the balance of the blend 50 mesh limestone, the blend having admixed therewith a solution comprised to 30 to 60 wt. % of a vinyl acetate-ethyl copolymer emulsion, the remainder water.

18 Claims, No Drawings

PROTECTIVE COATING COMPOSITION COMPRISING A BLEND OF POLYVINYL ACETATE, HYDRAULIC CEMENT, EVA, AND LIMESTONE

INTRODUCTION

This is a continuation in part application of U.S. application Ser. No. 697,958 filed 02/04/85, and now abandoned.

This invention relates to a coating composition and more particularly, it relates to a coating composition which has waterproof capabilities when applied to surfaces of cement block, brick plywood, paper and the like.

Because of the great expense involved in building construction, there is always interest in applying protective coatings to surfaces of concrete block, wood, et.g. plywood and the like in order to waterproof the surface or provide it with a protective coating to protect it from weathering elements in order to extend the useful life of the wood. Further, because the high cost of energy, it is important that coatings applied as noted have good insulative values so as to minimize the number of layers in walls and thereby keep construction costs economical.

Many of the prior art coating used in such construction tends to weather and harden thereby losing flexibility which results in cracking with the eventual penetration of rain and water and the resultant spalling of the coating and deterioration of the underlayer. If such coating products are used on roof structures, the cracking and spalling, of course, results in leaks and very costly repairs.

Other examples of particular surfaces which can benefit from protective coatings are bridge support structures and decks, sidewalks and driveways where salting is heavily used for snow and ice removal purposes. Also, other areas subject to severe weathering are industrial roofs, as well as those of homes, barns and the like. Yet, even though great selectiveness is practiced in these various applications, bridge structures and decks, just to note one example, are still subject to severe deterioration and are often required to be restored or replaced at high costs with great inconvenience to the users. Likewise, with respect to roofs, these too often need replacing and repair at tremendous expense to the owners. Thus, it can be seen that there is a great need for a coating which can be applied to metal, concrete or wood and the like which will extend their useful life significantly.

The present invention fulfills these needs by providing a coating composition which exhibits great bonding strength to metal, concrete or wood and the like and is substantially waterproof and resistant to chemicals, with high levels of abrasion resistance while maintaining flexibility to prevent cracking and deterioration.

SUMMARY OF THE INVENTION

An object of the present invention is to provide a coating composition for cement blocks, brick, plywood, hardboard and the like which is essentially waterproof.

Another object of the present invention is to provide a nonflamable coating composition which has excellent heat transfer resistance.

And another object of the present invention is to provide a coating composition having exceptional bonding strengh when applied to metal, concrete or the like, or wood products.

And yet another object of the present invention is to provide a coating composition having improved skid resistance when applied to walk ways and stair ways.

Yet another object of the present invention is to provide a coating composition for driveways and sidewalks highly resistant to salts, e.g. NaCl and chemicals.

A further object of the present invention is to provide an aesthetically appearing, protective coating for steel, wood or brick structures.

And yet a further object of the present invention is to provide a weather resistant coating which in its natural color is highly reflective and greatly facilitates temperature control when applied to roofs.

And yet an additional object of the present invention is to provide a coating composition having improved flexibility after aging thereby preventing cracking or spalling of the coating.

These and other objects of the invention will become apparent from the specification and claims appended hereto.

In accordance with these objects there is provided a composition suitable for coating objects to improve their useful life, the coating composition being waterproof and resistant to chemicals and abrasion. The coating composition comprised of a blend of hydraulic cement in the range of 5.0 to 18.0 wt. %, 200 mesh limestone in the range of 20.0 to 50 wt. %, 0.5 to 6.0 wt. % of polyvinyl acetate, the balance of the blend 50 mesh limestone the blend having admixed therewith a solution comprosed of 30 to 60 wt. % vinyl acetate-ethylene copolymer emulsion, the remainder water.

DETAILED DESCRIPTION OF THE PREFERRED EMBODIMENTS

In one aspect of the present invention, a coating composition is provided which is suitable for application to metal, concrete and ceramic, or wood surfaces to provide increased resistance to chemical, mechanical and abrasive type degradation. The coating composition has significant bonding strength to the above materials and because of its substantially 100% resistance to water and salt penetration provides improved useful life to structural and building members and components, for example. The coating composition comprises a blend of hydraulic cement in the range of about 5.0 to 18.0 wt %, 200 mesh limestone in the range of 20 to 50 wt. %, 0.5 to 6.0 wt. % polyvinyl acetate, the balance of the blend 50 mesh limestone. When these materials are thoroughly mixed or blended, there is admixed therewith a solution comprises of 30 to 60 wt. % of a vinyl acetate-ethylene copolymer emulsion, the remainder water. With respect to the dry blend, it is important that it be carried out a temperature sufficiently high to remove any residual water which might otherwise act to promote localized curing or setting of the cement material. Thus, it has been discovered that blending can be carried out preferably at a temperature in the range of about 180° to 125° F. for about 30 minutes to 90 minutes. However, it will be understood that other treatments such as blending under partial vacuum, for example, at room temperature can be effective in reducing the residual water content of the blend. The blending times and temperatures are an important aspect of the present invention and will be discussed in further detail hereinbelow.

In a preferred aspect of the invention, the blend for the composition should contain 8 to 16 wt. % hydraulic cement, 30 to 45 wt. % 200 mesh limestone, 0.8 to 4 wt. % polyvinyl acetate, the remainder 50 mesh limestone. To this blend is preferably added a solution comprised of 35 to 55 wt. % of a vinyl acetate-ethylene copolymer emulsion, the remainder water. It will be noted that the amount of liquid can be varied depending on the application. Further, the amount of dilution of the emulsion with water can be varied depending on the properties desired in the final product. A typical coating should contain in the dry blend 9.7 wt. % hydraulic cement, 29.3 wt. % 200 mesh limestone, 39.0 wt. % 50 mesh limestone, 1.0 wt. % polyvinyl acetate and a solution containing 50 wt. % which is 21.0 wt. % of vinyl acetate-ethylene copolymer emulsion, the remainder water. The blend and solution are stirred or mixed until a smooth homogenous mix is obtained.

Hydraulic cement that can be used in the present composition is Portland cement. One form of the limestone as noted earlier is 200 mesh (Tyler Series) and the second form of limestone is 60 mesh (Tyler Series). The use of two different sizes of limestone is important from the standpoint of packing or densifying the composition. However, the limestone is important from another standpoint. That is, the limestone, particularly the course material, provides abrasion resistance when the composition is used as a coating on walks and the like. In addition, the limestone combination in the composition is important in yet another respect. That is, it has been discovered that careful preparation of the blend greatly enhances insulation values when the composition is used as a coating. While the inventor does not necessarily wish to be bound by any theory of invention, it is believed that the enhances insulation quality results from the controlled heating of the limestone. The heating of the blend to reduce the water content also expands and provides porosity in the limestone particles. For example, if the blend is heated for about 1.5 hours at 200° F., it has been found that the limestone fraction can expand up to 30% or more in volume. This expansion or swelling of the limestone particles is a result of gas pockets that form. Upon cooling, these pockets remain and thus aid in providing enhanced insulation properties when the composition is used as a coating. Thus, the composition finds great use in it application to steam pipes. For example, steam pipes which otherwise would be providing blistering heat to the touch are otherwise found to be barely warm to the touch when a 3/16 inch coating of the composition is applied thereto. Likewise, particularly when white Portland cement is used, when a coating is applied for roof coating purposes, there results both enhanced reflectivity of heat and greatly reduced penetration of the heat through the roof. Typically, these insulation values can be obtained when the blend is treated for 30 to 90 minutes at temperatures in the range of 170° to 220° F. It will be understood that longer times as lower temperatures or shorter times at higher temperatures can be used and are not presently known to adversely affect the qualities of a coating of the composition. However, temperatures should be sufficiently low to prevent degradation of the polyvinyl acetate.

Further, with respect to the hydraulic cement content of a coating of the composition, it would be understood that higher levels can impart a certain amount of brittleness to the coating however this can result in higher tensile values. Thus, the content should be balanced depending on the properties desired in the final coating.

Polyvinyl acetate used in the coating composition is available from Air Products and Chemicals, Inc., under the tradename VINAC ® RP-251 where it is recommended for use as a concrete additive or cement topping mix in brochure number 151-119, incorporated herein by reference. The polyvinyl acetate is provided in powder form which, of course, is suitable for mixing with the dry blend.

The amount of polyvinyl acetate used for coating composition in accordance with the present invention is important. Generally, it has been found that the higher levels of polyvinyl acetate promote bonding and improve elasticity of the cured or dried coating while lower levels promote harness and brittleness when these properties are required. Thus, when higher levels of hydraulic cement are used to improve tensile strength, higher levels of polyvinyl acetate can be used to off-set the brittleness often attendent the higher cement level.

The vinyl acetate-ethylene copolymer emulsion with which the dry blend is admixed is available from Air Products and Chemicals, Inc., under the tradenames AIRFLEX ® 526-BP and AIRFLEX ® 400 TM where it is recommended for building products applications such as drywall wall treatment systems, spackles and adhesives in the publications A-526 (2M-9/75-MG) FPD and 151-210 both of which are incorporated herein by reference. In the preferred embodiments of the invention, a liquid with which the blend is mixed contains vinyl-acetate-ethylene copolymer emulsion and water. The liquid can contain up to 60% by vol. water with lower amounts up to about 30% by vol. water being useful where greater adhesive strength and faster cure of the coating composition is desired. Typically, the liquid would contain 60% vinyl acetate-ethylene copolymer emulsion and 40% water. The emulsion and water normally should be mixed for a short period of time prior to being mixed with the dry blend.

It will be appreciated that ethylene glycol may be added in sufficient amounts where freezing and thawing may be a problem during application of the coating. Alternatively, to avoid freezing, the coating composition can contain about 1 to 7 wt. % NaCl or $CaCl_2$ or like compounds. These salts may be conveniently added to the dry blend if desired. In addition, other materials may be added to improve adhesion and flexural properties.

In one embodiment, it is preferred to provide the coating composition in a consistency which permits spraying it for purposes of applying a coating in accordance with the invention. Where the coating composition is used in construction, it can be advantageous to dip the construction member, e.g. brick or block in a slurry of the composition of the present invention prior to the construction step. Thereafter, the construction member may be bonded together using the composition of the invention. In addition to spraying, the coating may be applied by trowel or brush.

For most purposes the coating is normally applied at ambient temperature. After the coating has been applied, it should be permitted to cure in order to provide resistance to both abrasion and corrosive environments. Normally the cure will take place in about 8 to 10 hours at ambient temperature. However, if the temperature is raised to about 130° F., then the cure time would not normally be greater than 4 to 5 hours.

While the vinyl acetate-ethylene copolymer has been used in an emulsion form, it will be understood that such may be provided in powder form. Thus, the only ingredient required to be added to provide a coating mix is water. Thus, for purposes of the invention, the vinyl acetate-ethylene copolymer in powder form may be added in an amount equivalent to that in the emulsion and mixed with the blend. This provides for a composition which is more easily shipped with only water being added where the coating is used. The powder form of the vinyl acetate-ethylene copolymer is also available from Air Products and referred to as AIRFLEX TM Redispersible Powders. These are spray dried polyvinyl acetate/ethylene vinyl acetate/ethylene copolymers.

The coating composition has the advantage that it can be reinforced with fibers where reinforcement is desired in the coating compositions of the invention. Thus, where the coating composition is used having fibers admixed therewith, additional strength can be obtained where the application is to roofs or walls.

For purposes of combing the dry mix or blend and the solution of vinyl acetate-ethylene copolymer emulsion, 8 to 25 lbs. of the blend can be added to a gallon of emulsion. Suitable coating composition can be provided where 10 to 18 lbs. of dry blend are added to a gallon of emulsion. Typical concentrations of dry blend to emulsion are in the range of 12 to 16 lbs. per gallon, e.g. about 14 lbs./gallon of emulsion.

If the vinyl acetate-ethylene copolymer is added in dry form, it should constitute not less than 10 to 15 wt. % of the blend normally 30 to 55 wt. %.

For purposes of determining the resistance of the composition to water penetration, Pittsburgh Testing Laboratory performed a 1000 hour water immersion test on panels of the composition and reported such test o have no effect on the coating. Further, in a 200 hour salt-fog test on the panels by Pittsburgh Testing Laboratory, it was reported that there was no effect.

While the invention has been described in terms of preferred embodiments, the claims appended hereto are intended to encompass other embodiments which fall within the scope of the invention.

What is claimed is:

1. A protective waterproof coating composition suitable for application to concrete and wood surfaces and other types of surfaces to provide the surfaces with increased abrasion and chemical resistance, the composition comprises a blend of hydraulic cement in the range of 5.0 to 18.0 wt. %, 200 mesh limestone in the range of 20 to 50 wt. %, and 0.5 to 6.0 wt. % polyvinyl acetate, the balance of 50 mesh limestone and admixed therewith a solution comprised of 30 to 60 wt. % of a vinyl acetate-ethylene copolymer emulsion, the remainder water, the concentration of blend in solution being in the range of 8 to 25 lbs./gallon of solution.

2. The coating composition in accordance with claim 1, wherein the hydraulic cement is in the range of 8 to 16 wt. %.

3. The coating composition in accordance with claim 1, wherein the 200 mesh limestone is in the range of 30 to 45 wt. %.

4. The coating composition in accordance with claim 1, wherein the polyvinyl acetate is in the range of 0.8 to 4 wt. %.

5. The coating composition in accordance with claim 1, wherein the blend is heated prior to mixing with said emulsion.

6. The coating composition in accordance with claim 1, wherein the hydraulic cement content is about 10 wt. %.

7. The coating composition in accordance with claim 1, wherein the 200 mesh limestone content is about 29 wt. %.

8. The coating composition in accordance with claim 1, wherein the 50 mesh limestone is about 39 wt. %.

9. The coating composition in accordance with claim 1, wherein, the polyvinyl acetate is about 1.0 wt. %.

10. The coating composition in accordance with claim 1, wherein the solution contains about 35 to 55 wt. % vinyl acetate-ethylene copolymer.

11. The coating composition in accordance with claim 1, wherein the blend is heated at a temperature in the range of 170° to 220° F.

12. The coating composition in accordance with claim 1, wherein the blend is heated for 30 to 90 minutes.

13. A protective waterproof coating composition suitable for application to concrete and wood surfaces and other types of surfaces to provide the surfaces with increased abrasion and chemical resistance, the composition comprised of a blend of hydraulic cement in the range of 8 to 16 wt. %, 200 mesh limestone in the range of 30 to 45 wt. % and 0.8 to 4.0 wt. % polyvinyl acetate, the balance 50 mesh limestone and admixed therewith a solution comprised of 35 to 55 wt. % of a vinyl acetate-ethylene copolymer emulsion, the remainder water, the concentration of blend in said solution being in the range of 10 to 18 lbs. per gallon.

14. The coating composition in accordance with claim 1, wherein the concentration of blend in the solution is in the range of 12 to 16 lbs. per gallon.

15. The coating composition in accordance with claim 13, wherein the blend is heated at a temperature in the range of 170° to 220° F. for a period of 30 to 90 minutes.

16. A protective waterproof coating composition suitable for coating on concrete and wood surfaces and other types of surfaces to provide the surfaces with increased abrasion and chemical resistance, the composition comprises:
  (i) a blend of hydraulic cement in the range of 8 to 16.0 wt. %, 200 mesh limestone in the range of 30 to 45 wt. %, and 0.8 to 4.0 wt. % polyvinyl acetate, the balance 50 mesh limestone;
  (ii) vinyl acetate-ethylene copolymer powder, the powder and blend forming a mixture containing 10 to 60 wt. % of the vinyl acetate-ethylene copolymer powder and;
  (iii) water.

17. The coating composition in accordance with claim 16, wherein said mixture is heated prior to adding said water.

18. The coating composition in accordance with claim 15, wherein the mixture contains 30 to 55 wt. % of the vinyl acetate-ethylene copolymer powder.

* * * * *